United States Patent
Wang et al.

(10) Patent No.: US 11,293,906 B2
(45) Date of Patent: Apr. 5, 2022

(54) METHOD FOR JUDGMENT OF CHEDDAR GRADE BASED ON IDENTIFICATION CHARACTERISTIC FLAVOR COMPOSITION

(71) Applicant: BEIJING TECHNOLOGY AND BUSINESS UNIVERSITY, Beijing (CN)

(72) Inventors: Bei Wang, Beijing (CN); Jing Wang, Beijing (CN); Yanping Cao, Beijing (CN); Li Tan, Beijing (CN); Baoguo Sun, Beijing (CN); Zhennai Yang, Beijing (CN)

(73) Assignee: BEIJING TECHNOLOGY AND BUSINESS UNIVERSITY, Beijing (CN)

( * ) Notice: Subject to any disclaimer, the term of this patent is extended or adjusted under 35 U.S.C. 154(b) by 590 days.

(21) Appl. No.: 16/267,365

(22) Filed: Feb. 4, 2019

(65) Prior Publication Data

US 2020/0080976 A1 Mar. 12, 2020

(30) Foreign Application Priority Data

Sep. 6, 2018 (CN) .......................... 201811040167.5

(51) Int. Cl.
*G01N 30/06* (2006.01)
*G01N 30/72* (2006.01)
(Continued)

(52) U.S. Cl.
CPC .......... *G01N 30/06* (2013.01); *A23C 19/068* (2013.01); *G01N 30/30* (2013.01);
(Continued)

(58) Field of Classification Search
None
See application file for complete search history.

(56) References Cited

FOREIGN PATENT DOCUMENTS

| CN | 101706490 | * | 5/2010 |
| CN | 107782827 | * | 3/2018 |

OTHER PUBLICATIONS

Chen, Z. et al., "K-Means Clustering with Improved Initial Center", Second International Workshop on Knowledge Discovery and Data Mining, 2009, pp. 790-792.*

(Continued)

*Primary Examiner* — Daniel S Larkin
(74) *Attorney, Agent, or Firm* — Jiwen Chen; Jacobson Holman PLLC

(57) ABSTRACT

The present invention discloses a method for judgment of cheddar cheese grade based on identification characteristic flavor compounds, comprising the following steps: selecting cheddar cheese of different grades as standard product, and extracting volatile flavor compounds from the standard product; using gas phase-sniffing device to screen out characteristic flavor compounds with higher flavor intensity from the volatile flavor compounds through aroma extract dilution analysis; proceeding with clustering of characteristic flavor compounds as screened out to obtain identification characteristic flavor compounds of cheddar cheese; measuring the concentration of identification characteristic flavor composition of cheddar cheese of known grade, and establish the training set for training of support vector machine; measuring the concentration of identification characteristic flavor composition of cheddar cheese to be tested, and inputting it into the support vector machine trained to judge the grade of cheddar cheese to be tested. The present invention aims to obtain the model of identification characteristic flavor compounds of cheddar cheese through statistical analysis, which is available for accurate judgment of cheddar cheese quality grade on this basis.

8 Claims, 2 Drawing Sheets

(51) Int. Cl.
*G01N 30/30* (2006.01)
*A23C 19/068* (2006.01)
*G01N 30/86* (2006.01)
*G01N 30/02* (2006.01)
*G01N 30/88* (2006.01)

(52) U.S. Cl.
CPC ..... *G01N 30/7206* (2013.01); *G01N 30/8651* (2013.01); *G01N 2030/025* (2013.01); *G01N 2030/067* (2013.01); *G01N 2030/3046* (2013.01); *G01N 2030/884* (2013.01)

(56) References Cited

OTHER PUBLICATIONS

Gan, H.H. et al., "Development and Validation of an APCI-MS/GC-MS Approach for the Classification and Prediction of Cheddar Cheese Maturity", Food Chemistry, vol. 190, 2016, pp. 442-447.*
Drake, M.A. et al., "Impact of Fat Reduction on Flavor and Flavor Chemistry of Cheddar Cheeses", Journal of Dairy Science, vol. 93, No. 11, 2010, pp. 5069-5081.*

* cited by examiner

METHOD FOR JUDGMENT OF CHEDDAR GRADE BASED ON IDENTIFICATION CHARACTERISTIC FLAVOR COMPOSITION

This application claims the priority benefit of Chinese Application No. 201811040167.5, filed Sep. 6, 2018, which is hereby incorporated by reference.

FIELD OF THE INVENTION

The present invention is related to the technical field of dairy products testing, in particular to a method for judgment of cheddar cheese grade based on identification characteristic flavor composition.

BACKGROUND ARTS

Flavor is one of the most important characteristics of food. Only a small part of numerous volatile substances in food has significant or auxiliary contribution to overall flavor. These compounds which play a dominant role in product flavor are called characteristic flavor compounds of the food.

Cheese is a fermented milk product, which contain *lactobacillus* with health benefits. 1 kg of cheese product is made of 10 kg of milk through concentration, which contains such nutrients as abundant protein, calcium, fat, phosphor and vitamin. Cheese is also the traditional food of United States, nearly all of countries in Europe, and other nomadic peoples in Northwest China. Cheddar cheese is an original cheese or natural cheese, which is made through a series of complicated processes, such as sterilization, fermentation, condensation and maturing. Cheddar cheese is a cheese of the highest yield in the world. It is used as a condiment as it is soft and apt to be melted. Its color ranges from white to light yellow, and its taste is also different in view of storage time. Some are slightly sweet (9 months); whereas others have strong taste (24 months).

Cheddar cheese falls into three levels according to classification standard of United States Department of Agriculture. In other words, commercial cheddar cheese is divided into (1) mild or young, (2) medium and (3) mature or strong according to its flavor, structure and texture, color and final appearance.

Flavor of cheese is highly related to its quality, which serves as the critical factor affecting its quality. Cheeses of varied grades have volatile characteristic flavor composition of varied concentration. Volatile composition of cheese comprises such volatile substances as fatty acid, alcohol, aldehyde, ester, ketone, lactone, pyrazine and sulfur compounds.

Presently, sensory evaluation is a traditional approach for definition the grades of cheddar cheese. However, sensory evaluation has such disadvantages as high discrepancy, low stability and the lack of supporting data despite of the fact that it can differentiate cheese flavor and quality. Chinese patent with publication number of CN103822980A has disclosed a method for quick judgment of quality of Jinhua ham, comprising the following steps: (1) using solvent assisted flavor evaporation (SAFE) combined with aroma extraction dilution analysis (AEDA) to identify the key aroma volatile compounds in different grades of Jinhua ham; (2) proceeding with quantify the key aroma compounds in Jinhua ham identified by AEDA; (3) establishing a key aroma compounds data base of different grades of Jinhua ham; (4) the identified aroma compounds which can used to determine the grades of Jinhua ham were further selected by statistical analysis; (5) a data base which can used to identify the grades of Jinhua ham was established; and (6) proceeding with judgment.

Nevertheless, presently an objective and effective method for verification of cheese flavor quality is still lacking.

SUMMARY OF THE INVENTION

The present invention provides a method for judgment of cheddar cheese grade based on identification characteristic flavor composition. It is applicable to proceed with accurate judgment of cheese grade through analysis with instruments.

To achieve aforesaid purpose, the present invention provides the following technical solutions:

A method for judgment of cheddar cheese grade based on identification characteristic flavor composition, comprising the following steps:

(1) selecting cheddar cheese of different grades as a standard product, and extracting volatile flavor compounds from the standard product;

(2) using gas phase-sniffing device to screen out characteristic flavor compounds of higher flavor intensity from the volatile flavor compounds through aroma extract dilution analysis;

(3) proceeding with clustering of characteristic flavor compounds as screened out in Step (2) to obtain identification characteristic flavor compounds of cheddar cheese;

(4) measuring the concentrations of identification characteristic flavor composition of cheddar cheese of known grade, and establishing a training set for training of a support vector machine; and (5) measuring the concentrations of identification characteristic flavor composition of cheddar cheese to be tested, and inputting the concentrations into the support vector machine trained to judge the grade of cheddar cheese to be tested.

Cheddar cheese is divided into (a) mild or young, (b) medium and (c) mature or strong according to its flavor, structure and texture, color and final appearance.

The judgment method according to the present invention aims to screen out flavor compounds with higher flavor intensity in cheddar cheese with the help of aroma extraction dilution analysis (AEDA) and a gas-phase sniffing device (GC-O), and then proceed with dimensionality reduction of flavor compounds with a clustering algorithm to screen out flavor compounds with higher contribution to overall aroma of different grades of cheddar cheese; finally, proceed with training of a support vector machine through training of concentrations of identification characteristic flavor compounds; and use the support vector machine for judgment of cheddar cheese of unknown grade.

In Step (1), a standard cheddar cheese is divided into mild or young; medium; and mature or strong.

SAFE is used to extract flavor compounds in cheddar cheese standard samples.

Flavor of cheese is highly related to its quality, which serves as the critical factor affecting its quality; cheese of varied grades has volatile characteristic flavor composition of varied concentration.

In Step (2), twenty-eight characteristic flavor compounds with higher flavor intensity are screened out from the volatile flavor compounds with the help of aroma extract dilution analysis and the gas phase-sniffing device, and GC-MS is used for definition of flavor compounds as screened out.

Furthermore, the gas chromatographic conditions are stated as follows: Helium is used as the carrier gas, of which flow velocity is up to 1 mL/min; chromatographic column is DB-WAX capillary column; temperature rise procedures of chromatographic column are stated as follows: the initial column temperature is 35° C., which is maintained for 5 minutes; solvent is delayed for 4 minutes, and then is increased to 100° C. at the rate of 5° C./min; the temperature is maintained for 2 minutes, and then is further increased to 180° C. at the rate of 6° C./min. Finally, it is increased at the rate of 8° C./min to 230° C., and then maintained for 2 minutes. The splitless mode is selected with the temperature of an injection port up to 250° C.

Mass spectrometry conditions are stated as follows: an electron ionization source is used; ionization energy is 70 eV; ion source temperature is 230° C.; interface temperature is 250° C.; quadrupole rod temperature is 150° C.; detector temperature is 280° C.; scan mode is full scan; mass range is m/z 20~350.

Twenty-eight flavor compounds comprise acid substances and neutral/alkali substances. The acid substances comprise acetic acid, 2-methyl propionic acid, butyric acid, 3-methyl butyric acid, pentanoic acid, hexanoic acid, heptanoic acid and nonanoic acid. The neutral/alkali substances comprise limonene, decanal, benzaldehyde, lauraldehyde, 2,3-butanedione, 2-heptanone, 2-nonanone, 2-undecanone, furanone, homofuraneol, ethyl butanoate, ethyl caproate, ethyl caprylate, ethyl caprate, δ-hexanolactone, ethyl laurate, δ-nonalactone, δ-decalactone, γ-dodecalactone and δ-dodecalactone.

To further simplify operation, it is necessary to proceed with dimensionality reduction of twenty-eight characteristic flavor compounds in order to screen out flavor compounds with higher contribution to overall aroma of cheddar cheese.

In a preferred embodiment, it further comprises establishment of cheddar cheese simulation system, deletion and recombination experiment on the content of characteristic flavor compounds in cheddar cheese and elimination of flavor compounds of less overall aroma contribution to cheddar cheese prior to Step (3).

In still a further embodiment, the eliminated flavor compounds with less contribution to overall aroma of cheddar cheese comprise acetic acid and nonanoic acid.

Step (3) aims at clustering of characteristic flavor compounds with a clustering algorithm to realize dimensionality reduction.

In a preferred embodiment, k-means clustering algorithm is used for clustering of characteristic flavor compounds in Step (3).

K-means clustering algorithm is a typical distance based clustering algorithm, which takes distance as similarity evaluation indicator. In other words, it is supposed that two objects with shorter distance have higher similarity. The clustering process is as follows: (a) selecting k objects from n data at random as an initial clustering center; (b) calculating the distance between each object and such central objects based on average value of each clustering object (central object); proceeding with secondary division of corresponding objects according to the minimum distance; (c) recalculating average value of each (varied) cluster (central object); (d) proceeding with circulation from (b) to (c) until each cluster remains unchanged.

Such a clustering algorithm is quick and simple, which is efficient for a large data set; furthermore, it is retractable, and is especially applicable to the present invention.

Selection of the number of cluster centers has significant impact on clustering results.

In a preferred embodiment, the number of cluster centers according to k-means clustering algorithm is set as 2-12.

When Relegating characteristic flavor compounds into 2-12 categories, and selecting 2-12 characteristic flavor compounds that are the nearest to the cluster center as identification flavor compounds of cheddar cheese, the accuracy of classification of cheddar cheese by the support vector machine is higher.

In still a further embodiment, the number of cluster centers according to k-means clustering algorithm is set as 2, 4, 5, 6, 7, 8 or 10. In a preferred embodiment, the number of cluster centers according to k-means clustering algorithm is set as 6.

When the number of cluster centers is set as 2, 4, 5, 6, 7, 8 or 10, the support vector machine will proceed with cross verification on the training samples with both accuracy and an f1-score being over 70%. In particular, when the number of cluster centers is 6, the support vector machine will proceed with cross verification on the training samples with both accuracy and the f1-score being up to 90%.

In a preferred embodiment, identification characteristic flavor compounds as screened out with k-means clustering algorithm comprise:

ethyl caprylate and 2-methyl propionic acid;

or 2-methyl propionic acid, butyric acid, ethyl caproate and δ-nonalactone;

or δ-nonalactone, 2-methyl propionic acid, hexanoic acid, ethyl caproate and 2,3-butanedione;

or δ-nonalactone, 2-methyl propionic acid, ethyl hexanoate, butyric acid, 2,3-butanedione and pentanoic acid;

or butyric acid, benzaldehyde, ethyl hexanoate, δ-nonalactone, 2,3-butanedione, 3-methyl butyric acid and pentanoic acid;

or ethyl hexanoate, δ-nonalactone, butyric acid, 3-methyl butyric acid, 2,3-butanedione, benzaldehyde, pentanoic acid and heptanoic acid;

or benzaldehyde, δ-nonalactone, butyric acid, ethyl hexanoate, 2,3-butanedione, 3-methyl butyric acid, heptanoic acid, 2-methyl propionic acid, pentanoic acid and δ-dodecalactone.

In a preferred embodiment, identification characteristic flavor compounds as screened out with k-means clustering algorithm have the following combination: δ-Nonalactone, 2-methyl propionic acid, ethyl caproate, butyric acid, 2,3-Butanedione and pentanoic acid.

In Step (4) and (5), a gas chromatograph-mass spectrometer is used to measure the concentration of identification characteristic flavor compounds of cheddar cheese of known grade and cheddar cheese to be tested.

Furthermore, gas chromatographic conditions are stated as follows: Helium is used as the carrier gas, of which flow velocity is up to 1 mL/min; chromatographic column is DB-WAX capillary column; temperature rise procedures of chromatographic column are stated as follows: Initial column temperature is 35° C., which is maintained for 5 minutes; solvent is delayed for 4 minutes, and then is increased to 100° C. at the rate of 5° C./min; the temperature is maintained for 2 minutes, and then is further increased to 180° C. at the rate of 6° C./min; finally, it is increased at the rate of 8° C./min to 230° C., and then maintained for 2 minutes; the splitless mode is selected with the temperature of injection port up to 250° C.

Mass spectrometry conditions are stated as follows: an electron ionization source is used; ionization energy is 70 eV; ion source temperature is 230° C.; interface temperature is 250° C.; quadrupole rod temperature is 150° C.; detector temperature is 280° C.; scan mode is full scan; mass range is m/z 20~350.

As compared with prior arts, the present invention has the following beneficial effects:

Presently, classification of cheddar cheese is mainly represented by sensory evaluation as carried out by sensory evaluators who are familiar with cheese products. However, such method lacks objective and effective data support, which requires much time and manpower. The present invention aims at precise qualitative and quantitative analysis of characteristic flavor compounds in cheddar cheese and establishment of database on this basis to obtain the model of identification characteristic flavor compounds of cheddar cheese through statistical analysis. After that, this method is used on this basis for quick and accurate judgment of cheddar cheese quality grade, and this method lays down a foundation for quick verification and testing of cheddar cheese for sale in the market.

PREFERRED EMBODIMENTS OF THE INVENTION

Figure 1:
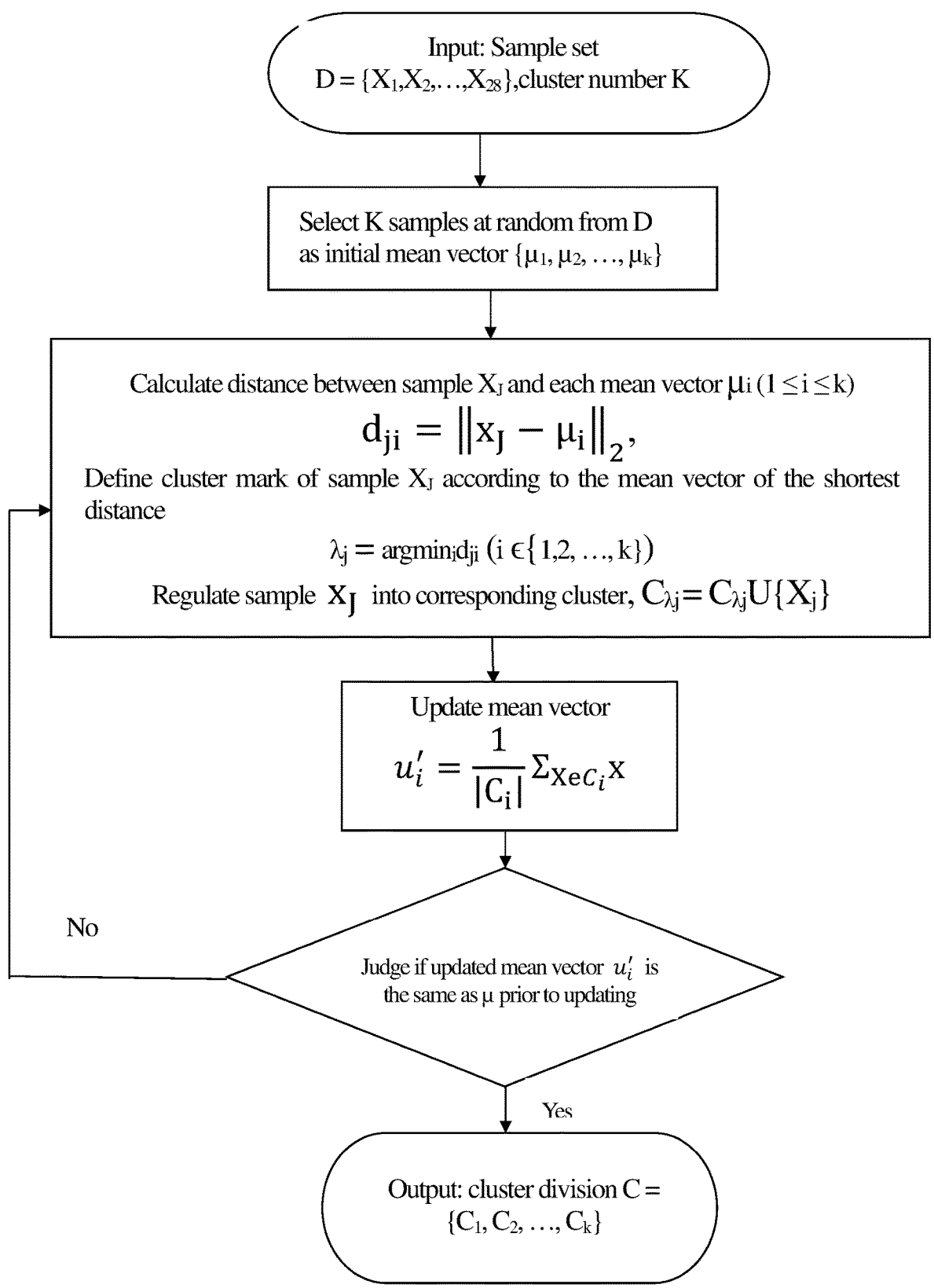
FIG. 1 is the flow chart for k-means clustering algorithm.

The present invention is described in details as follows in combination with drawings and embodiments; it should be pointed out that the following embodiments aim to facilitate understanding of the present invention other than restriction.

The method for judgment of cheddar cheese grade based on identification characteristic flavor compounds, comprising the following steps:

1. Establishment of Database for Characteristic Flavor Compounds of Cheddar Cheese (1) Selection of Standard Cheddar Cheese Samples Twelve commercial cheddar cheese samples were selected. Such samples are of cheddar cheese brands with the highest yield in the world. Such cheddar cheese products were divided into three grades, namely mild or young; medium; mature or strong. Conventional volatile compounds in cheddar cheese of varied grade were measured with the help of SAFE and gas chromatograph-mass spectrometer. Furthermore, descriptive sensory experiment and analysis were carried out to obtain cheese samples of each grade of cheddar cheese that were more acceptable to the people. Meanwhile, electronic nose for analysis of main constituents was used to obtain cheese samples with more approximate overall flavor. The three methods were used to screen out two representative mild or young; medium; and mature or strong cheddar cheeses, respectively, as six standard samples for cheddar cheeses to be analyzed, including Cabot™ cheese from United States, Kerrygold™ cheese from Ireland.

(2) Extracting Volatile Flavor Compounds in Standard Samples for Cheddar Cheese Through SAFE.

80 g of crushed cheddar cheese and 40 g sodium chloride were weighed, and put into two 250 ml Teflon™ bottles. After that, 240 ml absolute ether, 100 μL 2-methyl-3-heptanone with the concentration of 0.816 mg/mL and 100 μL 2-methyl valerate with the concentration of 0.931 mg/mL were added into the bottles as internal standards. The bottles were subject to shaking at the temperature of 4° C. and the revolution of 180 rpm for 8 hours prior to filtration and collection. Nitrogen was used to blow extracted solvent in the heart-shaped bottle to the concentration of 200 ml.

The SAFE apparatus was connected to a receiving tube and a waste tube. The glassware was then connected to an Edwards NXDS6I rotary vane pump as the vacuum source. The SAFE apparatus was kept thermostated at 40° C. using a circulating water bath. Liquid nitrogen was poured into the cooling trap and the receiver flasks. Distillation was carried out for 2 h under vacuum (~$10^{-4}$ Pa). After distillation, the distillate was dried over anhydrous sodium sulphate overnight, and then concentrated to about 1.0 mL using a Kuderna-Danish concentrator.

In order to eliminate the influence of high concentrations of acid compounds to other volatile compounds in cheese, a phase separation procedure was applied. The concentrated distillate was washed three times with 1 mL 0.5 M sodium bicarbonate and mixed thoroughly. After each wash, the bottom layer which is the water phase of the distillate, was removed and collected into a separate test tube. The concentrated solvent was then washed three times with 1 mL of saturated sodium chloride solution. Each time, the solution was mixed thoroughly and the water phase removed and collected into the same test tube. The remaining layer was collected as the neutral/basic fraction (NBF). Acidic fraction (AF) volatiles were recovered by acidifying the water layer collected from the concentrated distillate with hydrochloric acid (18% w/v) to a pH of 2.0 to 2.5. The acidified sample was then extracted three times with 3 mL ethyl ether. All extracts were dried over anhydrous sodium sulfate before concentration to 0.5 mL under a nitrogen gas stream.

1 μL SAFE extract was taken for GC-MS analysis. Gas chromatographic conditions were stated as follows: DB-WAX capillary column (30 m×0.25 mm, 0.25 μm) was used; helium was used as the carrier gas, of which flow velocity was up to 1 mL/min. The initial column temperature was 35° C., which was maintained for 5 minutes. The solvent was delayed for 4 minutes, and then was increased to 100° C. at the rate of 5° C./min. The temperature was maintained for 2 minutes, and then was further increased to 180° C. at the rate of 6° C./min. Finally, it was increased at the rate of 8° C./min to 230° C., and then maintained for 2 minutes. The splitless mode was selected with the temperature of injection port up to 250° C.

Mass spectrometry conditions were stated as follows: an electron ionization source was used; ionization energy was 70 eV; ion source temperature was 230° C.; interface temperature was 250° C.; quadrupole rod temperature was 150° C.; detector temperature was 280° C.; scan mode was full scan; mass range was m/z 20~350.

Data processing was completed at MassHunter chemical work station. The compounds to be verified were retrieved, and compared with reserved indexes of such volatile constituents in NIST 14 library of spectrogram as reported by literature on analysis of DB-WAX capillary column. Only verification results with matching degree over 800 were listed. Qualitative analysis was conducted on the volatile compounds obtained for quantitative analysis according to internal standard concentration.

(3) Use of aroma extraction dilution analysis (AEDA) to measure characteristic flavor compounds.

The hexane was used for serial dilution of concentrate obtained through solvent assisted flavor evaporation (SAEF) at the multiple of 3' (n=1, 2, 3, 4 . . . ). The dilution multiple was 3, 9, 27, 81, 243 The diluted solution was introduced into the gas phase-sniffing device (GC-O) for analysis until evaluator cannot sniff any odor at the terminal of sniffing port. The maximum dilution multiple of each volatile aromatic substance would be its FD factor (Flavor dilution factor).

The samples for each dilution multiple were analyzed by the sensory evaluator for three times. The result was deemed to be valid when sensory description was the same for two times within the same sniffing time. Finally, twenty-eight flavor compounds were defined with higher flavor intensity; see Table 1.

After that, standard compounds were dissolved in the hexane to prepare a solution as per concentration gradient (see Table 2). The prepared standard solution was prepared in the 4° C. fridge, and waited for 2 hours before use.

The 1 μL standard solution was taken for GC-MS analysis. The GC-MS conditions were the same as that mentioned

TABLE 1

Determination of Aroma Substance in Cheddar cheese with AEDA Method

| Serial No. | Volatile flavor compounds | Flavor[a] | Constituents[b] | RI[c] Literature value | RI[c] Calculated value | FD[d] 1 | 2 | 3 | 4 | 5 | 6 |
|---|---|---|---|---|---|---|---|---|---|---|---|
| 1 | 2,3-butanedione | Yoghurt | N/B | 979 | 951 | 9 | 9 | 27 | 81 | 27 | 81 |
| 2 | Ethyl butanoate | Aroma, sour and sweet | N/B | 1035 | 1018 | ND | 27 | ND | ND[e] | 3 | 81 |
| 3 | 2-Heptanone | Aroma | N/B | 1182 | 1155 | <1 | <1 | <1 | <1 | <1 | 27 |
| 4 | Limonene | Orange | N/B | 1200 | 1175 | 3 | <1 | 27 | 9 | 9 | <1 |
| 5 | Ethyl caproate | Aroma | N/B | 1233 | 1210 | <1 | 27 | <1 | <1 | <1 | 9 |
| 6 | 2-Nonanone | Soap | N/B | 1390 | 1357 | <1 | <1 | <1 | 3 | <1 | <1 |
| 7 | Acetic acid | Vinegar and tart flavor | AC | 1449 | 1392 | 27 | 9 | <1 | 27 | 81 | 81 |
| 8 | Ethyl caprylate | Cheese | N/B | 1435 | 1408 | 243 | 81 | 243 | 9 | 243 | 243 |
| 9 | Decanal | Putrid and sauerkraut flavor | N/B | 1498 | 1470 | 9 | 3 | <1 | <1 | <1 | 3 |
| 10 | Benzaldehyde | Grassy | N/B | 1520 | 1474 | 3 | ND | <1 | ND | 3 | 3 |
| 11 | 2-Undecanone | Boiled potato | N/B | 1598 | 1488 | 3 | <1 | <1 | <1 | <1 | 3 |
| 12 | 2-methyl propionic acid | Cow house and pungent smell | AC | 1570 | 1524 | <1 | ND | ND | <1 | 27 | 3 |
| 13 | Butyric acid | Milk and sour smell | AC | 1625 | 1579 | 81 | 81 | 81 | 81 | 243 | 81 |
| 14 | Ethyl caprate | Oil and butter | N/B | 1638 | 1612 | <1 | <1 | <1 | ND | 9 | 3 |
| 15 | 3-methyl butyric acid | Milk and sour smell | AC | 1666 | 1624 | 243 | 81 | 9 | 9 | 81 | 81 |
| 16 | lauraldehyde | Aroma and fragrance | N/B | 1711 | 1680 | <1 | 27 | <1 | 3 | <1 | 9 |
| 17 | Pentanoic acid | Sour and odorous smell | AC | 1733 | 1689 | <1 | <1 | <1 | <1 | <1 | 3 |
| 18 | δ-Hexanolactone | Nut and milk | N/B | 1791 | 1730 | 3 | ND | <1 | 3 | 3 | 3 |
| 19 | Hexanoic acid | Pungent and sour smell | AC | 1846 | 1793 | 9 | 9 | <1 | <1 | 3 | 81 |
| 20 | Ethyl laurate | Nut | N/B | 1841 | 1815 | <1 | 3 | ND | 3 | 3 | <1 |
| 21 | Heptanoic acid | Sour and sauerkraut | AC | 1950 | 1900 | <1 | ND | ND | 9 | 3 | <1 |
| 22 | δ-Nonalactone | Nut and toast | N/B | 2031 | 1907 | <1 | 3 | <1 | <1 | <1 | 3 |
| 23 | Furanone | Caramel | N/B | 2031 | 1981 | 243 | 27 | ND | 27 | 3 | 243 |
| 24 | Homofuraneol | Caramel | N/B | 2060 | 2006 | 81 | 27 | 27 | 3 | 3 | 81 |
| 25 | Nonanoic Acid | Bitter herbs | AC | 2171 | 2113 | 81 | 27 | 9 | 27 | 27 | 81 |
| 26 | δ-decalactone | Fat and butter | N/B | 2194 | 2134 | 81 | 81 | 243 | 81 | 81 | 27 |
| 27 | γ-Dodecalactone | Floral | N/B | 2374 | 2316 | 81 | 9 | 9 | 27 | 27 | 9 |
| 28 | δ-Dodecalactone | Soap, floral | N/B | 2436 | 2365 | 9 | 9 | 9 | 27 | 27 | <1 |

Note:
[a] refers to odor quality as sensed at the sniffing port during GC-O;
N/B in "b" refers to neutral/alkali compounds;
AC refers to acid compounds;
[c] refers to reserved index;
[d] refers to flavor dilution factor of different cheese sample, and sample 1-3 were Cabot™ cheeses from mild to mature, sample 4-6 were Kerrygold™ cheese from mild to mature;
[e] refers not detected,
(4) Precise quantitative analysis of characteristic flavor compounds
(A) Establishment of standard curve for characteristic flavor compounds The concentrations of standard products for twenty-eight characteristic flavor compounds as selected with AEDA method were selected at fourteen points within the approximately concentration range (concentration range as roughly measured according to preliminary experiment) to calculate standard curve (minimum value is $R^2>0.92$).

above. The correction factor under different concentration and average value were calculated by adding internal standard solution with constant content into external standard solution of different concentration. An external standard linear regression equation was used to calculate content of characteristic flavor substances in cheese samples based on internal standard semi-quantitative calculation results for correction with correction factor.

TABLE 2

Standard Concentration Gradient Configuration

| Volatile flavor compounds | Compound Concentration (μg/kg) | | | | | | | | | | | | | | |
|---|---|---|---|---|---|---|---|---|---|---|---|---|---|---|---|
| 2,3-butanedione | 200000 | 100000 | 500000 | 250000 | 12500 | 6250 | 3125 | 1563 | 781 | 391 | 195 | 98 | 49 | 24 |
| ethyl butanoate | 200000 | 100000 | 500000 | 250000 | 12500 | 6250 | 3125 | 1563 | 781 | 391 | 195 | 98 | 49 | 24 |
| 2-Heptanone | 200000 | 100000 | 500000 | 250000 | 12500 | 6250 | 3125 | 1563 | 781 | 391 | 195 | 98 | 49 | 24 |
| Limonene | 200000 | 100000 | 500000 | 250000 | 12500 | 6250 | 3125 | 1563 | 781 | 391 | 195 | 98 | 49 | 24 |
| Ethyl caproate | 200000 | 100000 | 500000 | 250000 | 12500 | 6250 | 3125 | 1563 | 781 | 391 | 195 | 98 | 49 | 24 |
| 2-Nonanone | 200000 | 100000 | 500000 | 250000 | 12500 | 6250 | 3125 | 1563 | 781 | 391 | 195 | 98 | 49 | 24 |
| Ethyl caprylate | 200000 | 100000 | 500000 | 250000 | 12500 | 6250 | 3125 | 1563 | 781 | 391 | 195 | 98 | 49 | 24 |
| Decanal | 200000 | 100000 | 500000 | 250000 | 12500 | 6250 | 3125 | 1563 | 781 | 391 | 195 | 98 | 49 | 24 |
| Benzaldehyde | 200000 | 100000 | 500000 | 250000 | 12500 | 6250 | 3125 | 1563 | 781 | 391 | 195 | 98 | 49 | 24 |
| 2-Undecanone | 200000 | 100000 | 500000 | 250000 | 12500 | 6250 | 3125 | 1563 | 781 | 391 | 195 | 98 | 49 | 24 |
| Ethyl caprate | 200000 | 100000 | 500000 | 250000 | 12500 | 6250 | 3125 | 1563 | 781 | 391 | 195 | 98 | 49 | 24 |
| lauraldehyde | 200000 | 100000 | 500000 | 250000 | 12500 | 6250 | 3125 | 1563 | 781 | 391 | 195 | 98 | 49 | 24 |
| δ-Hexanolactone | 200000 | 100000 | 500000 | 250000 | 12500 | 6250 | 3125 | 1563 | 781 | 391 | 195 | 98 | 49 | 24 |
| Ethyl laurate | 200000 | 100000 | 500000 | 250000 | 12500 | 6250 | 3125 | 1563 | 781 | 391 | 195 | 98 | 49 | 24 |
| δ-Nonalactone | 200000 | 100000 | 500000 | 250000 | 12500 | 6250 | 3125 | 1563 | 781 | 391 | 195 | 98 | 49 | 24 |
| Furanone | 200000 | 100000 | 500000 | 250000 | 12500 | 6250 | 3125 | 1563 | 781 | 391 | 195 | 98 | 49 | 24 |
| Homofuraneol | 200000 | 100000 | 500000 | 250000 | 12500 | 6250 | 3125 | 1563 | 781 | 391 | 195 | 98 | 49 | 24 |
| δ-decalactone | 200000 | 100000 | 500000 | 250000 | 12500 | 6250 | 3125 | 1563 | 781 | 391 | 195 | 98 | 49 | 24 |
| γ-Dodecalactone | 200000 | 100000 | 500000 | 250000 | 12500 | 6250 | 3125 | 1563 | 781 | 391 | 195 | 98 | 49 | 24 |
| δ- Dodecalactone | 200000 | 100000 | 500000 | 250000 | 12500 | 6250 | 3125 | 1563 | 781 | 391 | 195 | 98 | 49 | 24 |
| Acetic acid | 6000000 | 3000000 | 1500000 | 750000 | 375000 | 187500 | 93750 | 46875 | 23438 | 11719 | 5859 | 2930 | 1465 | 732 |
| 2-methyl propionic acid | 1000000 | 500000 | 250000 | 125000 | 62500 | 31250 | 15625 | 7813 | 3906 | 1953 | 977 | 488 | 244 | 122 |
| Butyric acid | 1000000 | 500000 | 250000 | 125000 | 62500 | 31250 | 15625 | 7813 | 3906 | 1953 | 977 | 488 | 244 | 122 |
| 3-methyl butyric acid | 1000000 | 500000 | 250000 | 125000 | 62500 | 31250 | 15625 | 7813 | 3906 | 1953 | 977 | 488 | 244 | 122 |
| Pentanoic acid | 1000000 | 500000 | 250000 | 125000 | 62500 | 31250 | 15625 | 7813 | 3906 | 1953 | 977 | 488 | 244 | 122 |
| Hexanoic acid | 1000000 | 500000 | 250000 | 125000 | 62500 | 31250 | 15625 | 7813 | 3906 | 1953 | 977 | 488 | 244 | 122 |
| Heptanoic acid | 1000000 | 500000 | 250000 | 125000 | 62500 | 31250 | 15625 | 7813 | 3906 | 1953 | 977 | 488 | 244 | 122 |
| Nonanoic acid | 1000000 | 500000 | 250000 | 125000 | 62500 | 31250 | 15625 | 7813 | 3906 | 1953 | 977 | 488 | 244 | 122 |

(b) Measurement of 28 compounds of cheddar cheese and establishment of database for characteristic flavor compounds The cheddar cheese simulation system was established, and the standard products were added into the substrate of simulation system according to external standard content of twenty-eight compounds. The deletion and recombination experiments were conducted on the content of flavor substances in standard cheddar cheese samples. The external standard quantitative analysis results were correct when flavor section profile of recombination samples was approximate to that of cheese samples.

According to comparison, there was not significant discrepancy between acetic acid-nonanoic acid deletion group and recombination samples; the most important aroma contribution of acetic acid-nonanoic acid were excluded.

To expand database for corresponding characteristic flavor compounds of different grade cheddar cheese, altogether twenty-seven marketable cheddar cheeses are collected, including six cheddar cheeses of unknown grade and twenty one known cheddar cheeses taken as cheese in sample library for the same preliminary treatment. A database for characteristic flavor compounds was established according to quantitative analysis results of different cheese samples. For results, please refer to Table 3.

TABLE 3

Database for Characteristic Flavor Compounds in Sample Library and Unknown Cheddar cheese

| Volatile compounds | m/Z[a] | Correction parameters | | Linear range | R² | Concentration (μg/kg) | | | | | | | | |
|---|---|---|---|---|---|---|---|---|---|---|---|---|---|---|
| | | Gradient | Intercept | | | 1 | 2 | 3 | 4 | 5 | 6 | 7 | 8 | 9 |
| 2,3-butanedione | 42, 43*, 86 | 0.3083 | −0.072 | 198468-48 | 0.9979 | 429.56 | 268.30 | 250.97 | 275.94 | 258.30 | 210.92 | 311.53 | 232.51 | 459.78 |
| ethyl butanoate | 43, 71*, 88 | 0.7287 | −0.0142 | 203237-99 | 0.9996 | 188.59 | 198.98 | 175.83 | 166.38 | 166.22 | 176.02 | 176.57 | 177.73 | 213.18 |
| 2-Heptanone | 43*, 58, 71 | 1.0977 | −0.1761 | 213295-52 | 0.9979 | 178.82 | 155.84 | 166.87 | 240.10 | 201.64 | 167.38 | 163.52 | 155.84 | 185.08 |
| Limonene | 68*, 93, 136 | 1.0225 | −0.229 | 194220-47 | 0.9906 | 218.29 | 292.67 | 226.84 | 210.67 | 218.32 | 225.08 | 220.04 | 220.92 | 221.50 |
| Ethyl caproate | 88*, 99, 101 | 0.791 | −0.0141 | 202081-49 | 0.9958 | 33.45 | 46.11 | 30.22 | 33.62 | 35.42 | 29.52 | 26.10 | 17.74 | 95.42 |
| 2-Nonanone | 43*, 58, 71 | 0.943 | −0.2015 | 213555-52 | 0.996 | 245.04 | 212.36 | 226.48 | 274.64 | 248.25 | 224.56 | 226.61 | 219.89 | 234.07 |
| Ethyl caprylate | 88*, 101, 127 | 1.3432 | −0.5105 | 203006-50 | 0.9929 | 444.55 | 382.66 | 354.49 | 436.64 | 395.45 | 360.51 | 353.60 | 360.11 | 436.83 |
| Decanal | 57*, 70, 82 | 0.9251 | −0.1108 | 215896-105 | 0.9978 | 115.03 | 112.99 | 119.46 | 114.00 | 112.99 | 117.02 | 124.75 | 114.92 | 120.76 |
| Benzaldehyde | 77, 105, 106* | 1.1043 | −0.3568 | 196127-48 | 0.9918 | 268.65 | 284.09 | 253.22 | 262.23 | 317.61 | 255.63 | 276.42 | 255.25 | 296.79 |
| 2-Undecanone | 43, 58*, 71 | 1.1593 | −0.5389 | 214335-52 | 0.9915 | 481.09 | 489.69 | 469.18 | 471.29 | 483.61 | 467.42 | 473.50 | 463.43 | 472.22 |
| Ethyl caprate | 88*, 101, 157 | 1.6253 | −0.8164 | 200000-49 | 0.9963 | 473.85 | 496.18 | 480.72 | 475.93 | 508.21 | 478.83 | 510.38 | 475.13 | 485.55 |
| lauraldehyde | 57, 82*, 96 | 1.625 | −0.8026 | 192832-188 | 0.9982 | 483.25 | 493.39 | 489.08 | 486.08 | 483.25 | 489.55 | 485.85 | 483.59 | 483.25 |
| δ-Hexanolactone | 42, 55, 70* | 0.445 | 0.0294 | 209191-52 | 0.9969 | 66.51 | 51.99 | 88.47 | 81.01 | 73.41 | 79.37 | 63.05 | 51.99 | 57.72 |
| Ethyl laurate | 88*, 101, 157 | 1.4632 | −0.7684 | 199306-97 | 0.9922 | 506.01 | 608.80 | 502.22 | 499.27 | 500.57 | 502.93 | 499.47 | 497.98 | 501.75 |
| δ-Nonalactone | 70, 71, 99* | 0.8733 | −0.5285 | 206474-101 | 0.9901 | 565.88 | 569.86 | 611.79 | 570.42 | 577.45 | 596.41 | 565.16 | 557.36 | 579.53 |
| Furanone | 43, 57, 128* | 0.6219 | −0.2933 | 181908-355 | 0.9997 | 371.98 | 385.79 | 383.92 | 368.57 | 370.08 | 375.13 | 368.64 | 368.34 | 374.43 |
| Homofuraneol | 57*, 85, 142 | 0.3332 | −0.7297 | 197168-770 | 0.9904 | 2342.23 | 3088.63 | 3003.61 | 2906.77 | 2844.28 | 2750.30 | 2039.43 | 1962.97 | 2809.69 |
| δ-decalactone | 70, 71, 99* | 1.1191 | −0.2494 | 193006-94 | 0.9908 | 232.42 | 225.34 | 257.10 | 234.03 | 272.26 | 269.60 | 212.52 | 201.84 | 212.37 |
| γ-Dodecalactone | 55, 85*, 128 | 0.931 | −0.0561 | 189364-92 | 0.9974 | 80.01 | 58.50 | 67.21 | 65.05 | 63.84 | 63.70 | 63.14 | 58.21 | 55.03 |
| δ-Dodecalactone | 70, 71, 99* | 1.7451 | −0.4219 | 192197-188 | 0.9967 | 308.93 | 522.44 | 268.80 | 256.69 | 288.63 | 261.98 | 252.51 | 207.66 | 488.71 |
| 2-methyl propionic acid | 45, 73*, 88 | 0.025 | −0.0152 | 988439-241 | 0.9953 | 0.00 | 0.00 | 1043.03 | 2991.04 | 595.84 | 595.84 | 2605.87 | 595.84 | 2593.53 |
| Butyric acid | 42, 60*, 73 | 0.0231 | −0.0056 | 1058728-258 | 0.9982 | 412696.07 | 161141.95 | 144619.98 | 495513.34 | 287189.49 | 172601.09 | 318989.30 | 275771.49 | 655308.68 |
| 3-methyl butyric acid | 43, 60*, 87 | 0.0246 | −0.0023 | 980607-239 | 0.9998 | 6585.00 | 883.52 | 457.50 | 1336.05 | 263.63 | 463.59 | 7548.49 | 193.43 | 3713.49 |
| Pentanoic acid | 41, 60*, 73 | 0.0237 | 0.0136 | 1004133-245 | 0.9984 | 2174.17 | 2242.85 | 8203.96 | 5306.24 | 2636.23 | 3548.15 | 1726.88 | 2456.61 | 7448.33 |
| Hexanoic acid | 60*, 73, 87 | 0.0281 | 0.0882 | 994509-243 | 0.9976 | 78357.78 | 52988.53 | 7017.28 | 164387.42 | 86473.51 | 68479.51 | 57293.28 | 80309.75 | 203478.18 |
| Heptanoic acid | 60*, 73, 87.3 | 0.0362 | −0.0029 | 1008208-246 | 0.9958 | 1640.88 | 81.24 | 801.35 | 492.29 | 911.89 | 1003.79 | 490.42 | 405.15 | 1685.60 |

| Volatile compounds | m/Z[a] | Correction parameters | | Linear range | R² | Concentration (μg/kg) | | | | | | | | |
|---|---|---|---|---|---|---|---|---|---|---|---|---|---|---|
| | | Gradient | Intercept | | | 10 | 11 | 12 | 13 | 14 | 15 | 16 | 17 | 18 |
| 2,3-butanedione | 42, 43*, 86 | 0.3083 | 0.072 | 198468-48 | 0.9979 | 212.60 | 361.30 | 317.38 | 336.14 | 1526.15 | 595.75 | 376.84 | 670.27 | 392.95 |
| ethyl butanoate | 43, 71*, 88 | 0.7287 | −0.0142 | 203237-99 | 0.9996 | 186.21 | 183.33 | 172.58 | 167.73 | 170.15 | 345.83 | 166.38 | 166.38 | 195.91 |
| 2-Heptanone | 43*, 58, 71 | 1.0977 | −0.1761 | 213295-52 | 0.9979 | 182.87 | 162.52 | 177.65 | 156.86 | 157.59 | 180.54 | 179.52 | 178.11 | 300.47 |
| Limonene | 68*, 93, 136 | 1.0225 | −0.229 | 194220-47 | 0.9906 | 229.26 | 224.46 | 222.77 | 216.08 | 218.20 | 209.10 | 296.95 | 229.66 | 230.57 |
| Ethyl caproate | 88*, 99, 101 | 0.791 | −0.0141 | 202081-49 | 0.9958 | 24.23 | 89.89 | 49.48 | 28.26 | 378.00 | 17.74 | 17.74 | 17.74 | 79.61 |
| 2-Nonanone | 43*, 58, 71 | 0.943 | −0.2015 | 213555-52 | 0.996 | 233.97 | 261.29 | 249.03 | 228.48 | 470.57 | 246.87 | 274.57 | 291.55 | 252.11 |
| Ethyl caprylate | 88*, 101, 127 | 1.3432 | −0.5105 | 203006-50 | 0.9929 | 356.01 | 373.36 | 399.17 | 358.71 | 383.65 | 422.54 | 422.96 | 388.23 | 394.18 |
| Decanal | 57*, 70, 82 | 0.9251 | −0.1108 | 215896-105 | 0.9978 | 115.78 | 114.46 | 112.99 | 115.40 | 113.88 | 114.86 | 121.82 | 115.01 | 118.24 |
| Benzaldehyde | 77, 105, 106* | 1.1043 | −0.3568 | 196127-48 | 0.9918 | 257.41 | 254.24 | 2415.04 | 253.73 | 267.03 | 256.08 | 288.36 | 262.00 | 261.15 |
| 2-Undecanone | 43, 58*, 71 | 1.1593 | −0.5389 | 214335-52 | 0.9915 | 465.73 | 470.67 | 476.28 | 465.25 | 481.85 | 474.84 | 474.44 | 488.10 | 478.48 |
| Ethyl caprate | 88*, 101, 157 | 1.6253 | −0.8164 | 200000-49 | 0.9963 | 480.68 | 473.85 | 481.14 | 485.67 | 484.14 | 533.90 | 492.65 | 484.20 | 473.85 |
| lauraldehyde | 57, 82*, 96 | 1.625 | −0.8026 | 192832-188 | 0.9982 | 489.91 | 483.25 | 488.49 | 483.76 | 483.93 | 545.35 | 494.04 | 484.73 | 508.39 |
| δ-Hexanolactone | 42, 55, 70* | 0.445 | −0.0294 | 209191-52 | 0.9969 | 62.11 | 55.79 | 65.60 | 78.55 | 56.09 | 64.12 | 92.72 | 59.61 | 74.61 |
| Ethyl laurate | 88*, 101, 157 | 1.4632 | −0.7684 | 199306-97 | 0.9922 | 497.74 | 497.86 | 501.36 | 497.64 | 499.12 | 559.27 | 501.33 | 499.74 | 511.09 |

TABLE 3-continued

Database for Characteristic Flavor Compounds in Sample Library and Unknown Cheddar cheese

| Volatile compounds | m/Z[a] | Correction parameters | | | | Concentration (μg/kg) | | | | | | | | |
|---|---|---|---|---|---|---|---|---|---|---|---|---|---|---|
| | | Gradient | Intercept | Linear range | $R^2$ | 19 | 20 | 21 | H200-139 | H200-142 | H84-82 | H84-79 | G218B | G218C |
| δ-Nonalactone | 70, 71, 99* | 0.8733 | −0.5285 | 206474-101 | 0.9901 | 559.98 | 568.72 | 566.98 | 562.40 | 557.04 | 578.97 | 564.54 | 577.50 | 573.16 |
| Furanone | 43, 57, 128* | 0.6219 | −0.2933 | 181908-355 | 0.9997 | 371.32 | 366.86 | 368.42 | 367.68 | 367.59 | 369.34 | 374.08 | 366.86 | 371.24 |
| Homofuraneol | 57*, 85, 142 | 0.3332 | −0.7297 | 197168-770 | 0.9904 | 1803.08 | 2368.34 | 2817.10 | 2185.94 | 2686.38 | 3168.12 | 3096.98 | 3138.30 | 3184.43 |
| δ-decalactone | 70, 71, 99* | 1.1191 | −0.2494 | 193006-94 | 0.9908 | 208.16 | 221.40 | 224.67 | 215.10 | 219.48 | 265.42 | 221.72 | 238.93 | 237.95 |
| γ-Dodecalactone | 55, 85*, 128 | 0.931 | −0.0561 | 189364-92 | 0.9974 | 59.41 | 66.04 | 67.91 | 65.71 | 70.07 | 97.45 | 57.32 | 81.06 | 60.78 |
| δ-Dodecalactone | 70, 71, 99* | 1.7451 | −0.4219 | 192197-188 | 0.9967 | 252.43 | 261.63 | 207.66 | 229.75 | 207.66 | 280.65 | 207.66 | 207.66 | 352.99 |
| 2-methyl propionic acid | 45, 73*, 88 | 0.025 | −0.0152 | 988439-241 | 0.9953 | 831.99 | 595.84 | 14120.99 | 752.08 | 4685.94 | 858.47 | 4007.07 | 2912.65 | 3948.97 |
| Butyric acid | 42, 60*, 73 | 0.0231 | −0.0056 | 1058728-258 | 0.9982 | 186560.52 | 265783.39 | 292740.00 | 144062.39 | 264359.99 | 276773.16 | 647990.49 | 275151.86 | 329746.61 |
| 3-methyl butyric acid | 43, 60*, 87 | 0.0246 | −0.0023 | 980607-239 | 0.9998 | 174.51 | 132.28 | 58222.41 | 160.19 | 17221.36 | 606.01 | 8457.35 | 41365.95 | 608.66 |
| Pentanoic acid | 41, 60*, 73 | 0.0237 | 0.0136 | 1004133-245 | 0.9984 | 2454.92 | 2890.54 | 3860.77 | 1302.05 | 1863.92 | 4097.30 | 13007.56 | 5289.34 | 5629.86 |
| Hexanoic acid | 60*, 73, 87 | 0.0281 | 0.0882 | 994509-243 | 0.9976 | 34326.82 | 81401.10 | 111578.31 | 43583.53 | 84057.31 | 88655.92 | 196324.22 | 113203.11 | 105241.10 |
| Heptanoic acid | 60*, 73, 87.3 | 0.0362 | −0.0029 | 1008208-246 | 0.9958 | 507.72 | 171.81 | 678.37 | 335.40 | 196.33 | 1066.32 | 1010.94 | 870.47 | 1011.08 |
| 2,3-butanedione | 42, 43*, 86 | 0.3083 | 0.072 | 198468-48 | 0.9979 | 1523.89 | 2349.87 | 239.89 | 1539.51 | 2182.39 | 699.99 | 4282.96 | 501.66 | 386.06 |
| ethyl butanoate | 43, 71*, 88 | 0.7287 | −0.0142 | 203237-99 | 0.9996 | 210.18 | 201.22 | 198.17 | 229.24 | 309.24 | 206.87 | 184.89 | 203.40 | 194.67 |
| 2-Heptanone | 43*, 58, 71 | 1.0977 | −0.1761 | 213295-52 | 0.9979 | 243.97 | 232.22 | 261.62 | 265.66 | 246.23 | 277.99 | 246.88 | 272.37 | 259.69 |
| Limonene | 68*, 93, 136 | 1.0225 | −0.229 | 194220-47 | 0.9906 | 342.43 | 416.11 | 447.72 | 431.60 | 303.62 | 405.46 | 471.40 | 338.78 | 263.62 |
| Ethyl caproate | 88*, 99, 101 | 0.791 | −0.0141 | 202081-49 | 0.9958 | 32.47 | 23.22 | 42.43 | 17.74 | 17.74 | 74.14 | 82.56 | 33.89 | 34.58 |
| 2-Nonanone | 43*, 58, 71 | 0.943 | −0.2015 | 213555-52 | 0.996 | 269.22 | 229.90 | 258.08 | 228.13 | 262.03 | 255.37 | 242.16 | 300.55 | 273.25 |
| Ethyl caprylate | 88*, 101, 127 | 1.3432 | −0.5105 | 203006-50 | 0.9929 | 362.47 | 390.59 | 397.34 | 360.50 | 355.81 | 391.79 | 394.41 | 409.58 | 414.71 |
| Decanal | 57*, 70, 82 | 0.9251 | −0.1108 | 215896-105 | 0.9978 | 123.30 | 112.99 | 112.99 | 112.99 | 120.02 | 112.99 | 112.99 | 112.99 | 112.99 |
| Benzaldehyde | 77, 105, 106* | 1.1043 | −0.3568 | 196127-48 | 0.9918 | 262.97 | 259.04 | 256.52 | 259.93 | 311.21 | 275.22 | 265.35 | 262.30 | 268.54 |
| 2-Undecanone | 43, 58*, 71 | 1.1593 | −0.5389 | 214335-52 | 0.9915 | 477.63 | 469.51 | 482.64 | 470.84 | 484.84 | 473.70 | 472.50 | 484.69 | 479.95 |
| Ethyl caprate | 88*, 101, 157 | 1.6253 | −0.8164 | 200000-49 | 0.9963 | 477.66 | 492.49 | 504.11 | 488.70 | 481.22 | 478.69 | 512.38 | 490.49 | 514.69 |
| lauraldehyde | 57, 82*, 96 | 1.625 | −0.8026 | 192832-188 | 0.9982 | 493.97 | 484.91 | 489.19 | 489.71 | 486.44 | 491.71 | 485.53 | 495.79 | 497.52 |
| δ-Hexanolactone | 42, 55, 70* | 0.445 | −0.0294 | 209191-52 | 0.9969 | 89.34 | 60.11 | 78.02 | 90.94 | 98.69 | 75.09 | 74.28 | 83.48 | 73.59 |
| Ethyl laurate | 88*, 101, 157 | 1.4632 | −0.7684 | 199306-97 | 0.9922 | 507.05 | 498.09 | 500.97 | 516.26 | 589.46 | 510.60 | 501.34 | 503.79 | 511.83 |
| δ-Nonalactone | 70, 71, 99* | 0.8733 | −0.5285 | 206474-101 | 0.9901 | 610.36 | 587.18 | 599.10 | 591.21 | 624.70 | 571.69 | 611.32 | 585.42 | 612.10 |
| Furanone | 43, 57, 128* | 0.6219 | −0.2933 | 181908-355 | 0.9997 | 377.92 | 375.42 | 375.80 | 374.02 | 385.09 | 366.86 | 606.32 | 376.45 | 415.23 |
| Homofuraneol | 57*, 85, 142 | 0.3332 | −0.7297 | 197168-770 | 0.9904 | 3870.12 | 3717.42 | 4073.46 | 2831.35 | 4615.60 | 4030.18 | 4107.18 | 4249.65 | 4267.73 |
| δ-decalactone | 70, 71, 99* | 1.1191 | −0.2494 | 193006-94 | 0.9908 | 267.78 | 252.07 | 239.63 | 226.93 | 318.71 | 246.47 | 234.36 | 248.80 | 231.57 |
| γ-Dodecalactone | 55, 85*, 128 | 0.931 | −0.0561 | 189364-92 | 0.9974 | 278.31 | 75.72 | 64.67 | 339.76 | 86.32 | 198.37 | 80.96 | 68.20 | 246.13 |
| δ-Dodecalactone | 70, 71, 99* | 1.7451 | −0.4219 | 192197-188 | 0.9967 | 251.22 | 207.66 | 273.85 | 234.71 | 271.79 | 244.32 | 225.76 | 207.66 | 228.40 |
| 2-methyl propionic acid | 45, 73*, 88 | 0.025 | −0.0152 | 988439-241 | 0.9953 | 1974.25 | 825.74 | 1955.89 | 1771.96 | 1044.91 | 1354.58 | 1496.38 | 1202.67 | 595.84 |
| Butyric acid | 42, 60*, 73 | 0.0231 | −0.0056 | 1058728-258 | 0.9982 | 618583.97 | 661003.61 | 783061.69 | 607457.86 | 833411.38 | 671829.17 | 611402.80 | 750006.71 | 838592.99 |
| 3-methyl butyric acid | 43, 60*, 87 | 0.0246 | −0.0023 | 980607-239 | 0.9998 | 2231.40 | 3188.52 | 1963.12 | 1640.02 | 738.13 | 2857.08 | 1727.10 | 1777.76 | 2031.10 |
| Pentanoic acid | 41, 60*, 73 | 0.0237 | 0.0136 | 1004133-245 | 0.9984 | 3687.46 | 5747.19 | 6661.99 | 4239.30 | 0.00 | 6084.50 | 4836.04 | 6619.41 | 7201.05 |
| Hexanoic acid | 60*, 73, 87 | 0.0281 | 0.0882 | 994509-243 | 0.9976 | 154887.43 | 173745.27 | 240331.07 | 119583.37 | 202626.56 | 189214.88 | 154306.99 | 230982.59 | 263562.18 |
| Heptanoic acid | 60*, 73, 87.3 | 0.0362 | −0.0029 | 1008208-246 | 0.9958 | 452.73 | 1000.80 | 3019.79 | 1618.45 | 1829.36 | 1067.47 | 2438.34 | 1489.25 | 2340.98 |

Among samples listed in Table 3, 1-9 were mild or young cheddar cheeses, 10-18 were medium ones; 18-21 were mature or strong ones.

2. Generation of the Model for Identification Characteristic Flavor Compounds

K-means clustering method was used for clustering analysis of twenty-eight characteristic flavor compounds in Table 3 according to discrepancy to content of twenty-eight characteristic compounds in cheddar cheese of varied grade. They were divided into numerous clusters, and several characteristic compounds that were the nearest to the cluster center were taken as identification characteristic flavor compounds. The identification characteristic flavor compounds were used for judgment of grade of cheddar cheese samples. This aimed to reduce the number of characteristic flavor compounds, and improved classification efficiency and accuracy. The specific steps were stated as follows: (1) Concentration data on flavor compounds: Quantitative analysis results of twenty-eight characteristic flavor compounds in twenty one cheddar cheese samples of known grade were as shown in Table 3; wherein, distribution of sample grades was stated as follows: mild or young, medium and mature or strong.

(2) K-means clustering of twenty-eight characteristic flavor compounds of varied grades in Table 3 was conducted according to discrepancy to the content of twenty-eight characteristic compounds in cheddar cheese of varied grades. The major parameters included the number K of clusters. The accuracy and f1-score as judged based on cheddar cheese samples were taken as evaluation indicator to define final value K; clustering flow chart is as shown in FIG. 1. The result was output cluster division C={C1,C2, . . . ,Ck}. K flavor compounds that are the nearest to the K cluster centers were calculated. The different combinations of identification characteristic flavor compounds based on different value K were obtained.

TABLE 4

Identification Characteristic Flavor Compounds for Different Cheddar cheeses

| Cluster No. K | Combination of volatile compounds |
|---|---|
| 2 | Ethyl caprylate and 2-methyl propionic acid |
| 4 | 2-methyl propionic acid, butyric acid, ethyl caproate andδ-nonalactone |
| 5 | δ-nonalactone, 2-methyl propionic acid, hexanoic acid, ethyl caproate and 2,3-butanedione |
| 6 | δ-nonalactone, 2-methyl propionic acid, ethyl hexanoate, butyric acid, 2,3-butanedione and pentanoic acid |
| 7 | Butyric acid, benzaldehyde, ethyl hexanoate, δ-nonalactone, 2,3-butanedione, 3-methyl butyric acid and pentanoic acid |
| 8 | Ethyl hexanoate, δ-nonalactone, butyric acid, 3-methyl butyric acid, 2,3-butanedione, benzaldehyde, pentanoic acid and heptanoic acid |
| 10 | Benzaldehyde, δ-nonalactone, butyric acid, ethyl hexanoate, 2,3-butanedione, 3-methyl butyric acid, heptanoic acid, 2-methyl propionic acid, pentanoic acid andδ-dodecalactone |

3. Judgment of Cheddar Cheese of Unknown Grade

Use of support vector machine (SVM) model to judge cheddar cheese of unknown grade.

The identification characteristic flavor compounds for different cheddar cheeses were reserved in reference to Table 4. The twenty one samples were input into the support vector machine model for classification. The accuracy and f1-score were obtained through cross verification (CV=5). The f1-score was a harmonic mean of precision and recall. The higher the f1-score was, the better model performance would be.

Figure 2:
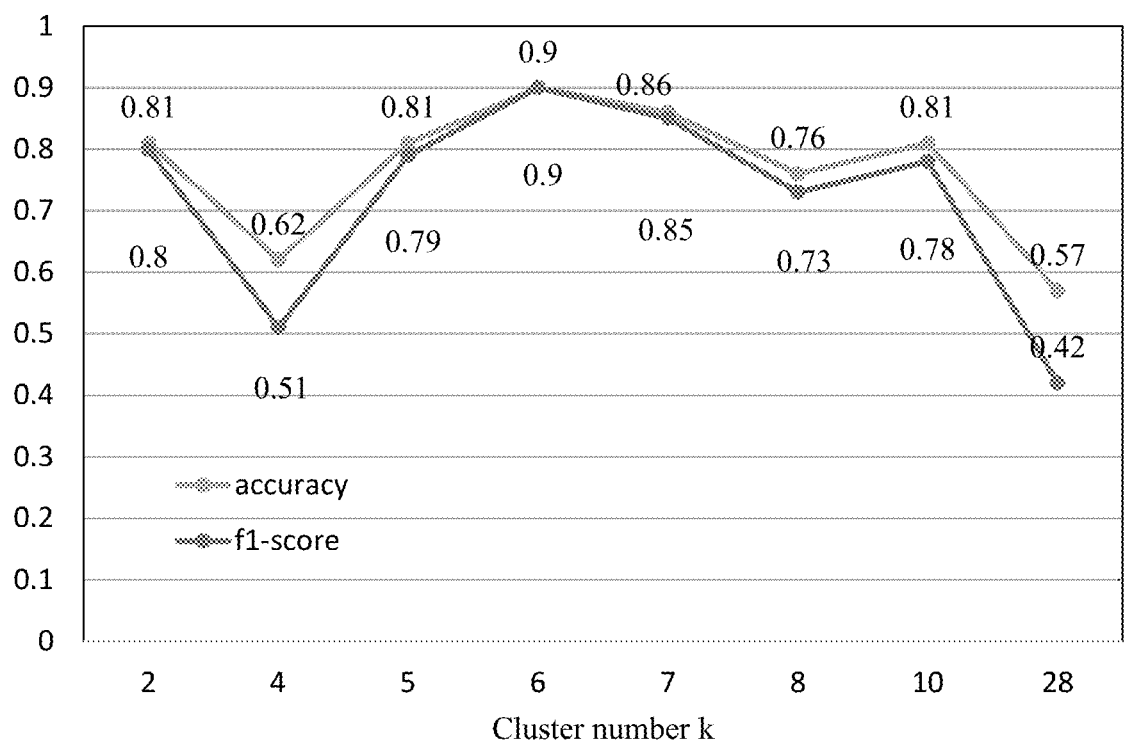
FIG. 2 shows classification accuracy and f1-score of identification characteristic flavor compounds of different cheddar cheese selected.

As shown in FIG. 2, when cluster number was 6, and characteristic flavor compounds in cheddar cheese comprise δ-nonalactone, 2-methyl propionic acid, ethyl caproate, butyric acid, 2,3-butanedione and pentanoic acid, classification effect would be the best, and accuracy and f1-score were up to 90%. This was favorable for better differentiation of negative samples, identification of positive samples and judgment of cheddar cheese of unknown grade.

δ-nonalactone, 2-methyl propionic acid, ethyl caproate, butyric acid, 2,3-butanedione and pentanoic acid were reserved as identification characteristic compounds of cheddar cheese, and 21 samples were input into the support vector machine model for training of support vector machine.

The concentration of δ-nonalactone, 2-methyl propionic acid, ethyl caproate, butyric acid, 2,3-butanedione and pentanoic acid in the cheddar cheese of unknown grade were measured, and input into the well trained support vector machine for judgment of cheddar cheese grade.

Aforesaid embodiments provide a detailed description of technical solutions and beneficial effects of the present invention; it is to be understood that what mentioned above are only preferred embodiments of the present invention, and are not used to restrict the present invention; any alteration, supplement and equivalent substitution as made based on principles of the present invention will be under the protection of the present invention.

The invention claimed is:

1. A method for judgment of cheddar cheese grade based on identification characteristic flavor compounds, characterized in that the method comprises the following steps:
   (1) selecting cheddar cheeses of different grades as standard products, and extracting volatile flavor compounds from the standard products;
   (2) using a gas phase-sniffing device to screen out characteristic flavor compounds with higher flavor intensity from the volatile flavor compounds through aroma extract dilution analysis;
   (3) proceeding with clustering of characteristic flavor compounds as screened out in the step (2) to obtain identification characteristic flavor compounds of cheddar cheeses;
   (4) measuring concentrations of the identification characteristic flavor compounds of cheddar cheeses of known grades, and establishing a training set for training of a support vector machine; and
   (5) measuring the concentrations of the identification characteristic flavor compounds of cheddar cheese to be tested, and inputting the concentrations into the support vector machine trained to judge the grade of cheddar cheeses to be tested;
   wherein the method further comprises establishment of a cheddar cheese simulation system, deletion and recombination experiment on the content of the characteristic flavor compounds in cheddar cheeses and elimination of flavor compounds of less overall aroma contribution to cheddar cheeses prior to the step (3).

2. The method for judgment of cheddar cheese grade based on identification characteristic flavor compounds according to claim 1, characterized in that the characteristic flavor compounds screened out in step (2) comprises acid substances and neutral/alkali substances; the acid substances comprise acetic acid, 2-methyl propionic acid, butyric acid, 3-methyl butyric acid, pentanoic acid, hexanoic acid, heptanoic acid and nonanoic acid; the neutral/alkali substances comprise limonene, decanal, benzaldehyde, lauraldehyde, 2,3-butanedione, 2-heptanone, 2-nonanone, 2-undecanone, furanone, homofuraneol, ethyl butanoate, ethyl caproate, ethyl caprylate, ethyl caprate, δ-hexanolactone, ethyl laurate, δ-nonalactone, δ-decalactone, γ-dodecalactone and δ-dodecalactone.

3. The method for judgment of cheddar cheese grade based on identification characteristic flavor compounds according to claim 1, characterized in that a k-means clustering algorithm is used for clustering of the characteristic flavor compounds in step (3).

4. The method for judgment of cheddar cheese grade based on identification characteristic flavor compounds according to claim 3, characterized in that a cluster center number according to the k-means clustering algorithm is 2-10.

5. The method for judgment of cheddar cheese grade based on identification characteristic flavor compounds according to claim 3, characterized in that a cluster center number according to the k-means clustering algorithm is 2, 4, 5, 6, 7, 8 or 10.

6. The method for judgment of cheddar cheese grade based on identification characteristic flavor compounds according to claim 5, characterized in that the identification characteristic flavor composition screened out with k-means clustering algorithm comprises:
   ethyl caprylate and 2-methyl propionic acid;
   or 2-methyl propionic acid, butyric acid, ethyl caproate and δ-nonalactone
   or δ-nonalactone, 2-methyl propionic acid, hexanoic acid, ethyl caproate and 2,3-butanedione
   or δ-nonalactone, 2-methyl propionic acid, ethyl hexanoate, butyric acid, 2,3-butanedione and pentanoic acid;
   or butyric acid, benzaldehyde, ethyl hexanoate, δ-nonalactone, 2,3-butanedione, 3-methyl butyric acid and pentanoic acid;
   or ethyl hexanoate, δ-nonalactone, butyric acid, 3-methyl butyric acid, 2,3-butanedione, benzaldehyde, pentanoic acid and heptanoic acid
   or benzaldehyde, δ-nonalactone, butyric acid, ethyl hexanoate, 2,3-butanedione, 3-methyl butyric acid, heptanoic acid, 2-methyl propionic acid, pentanoic acid and δ-dodecalactone.

7. The method for judgment of cheddar cheese grade based on identification characteristic flavor compounds according to claim 1, characterized in that in step (4) and (5), a gas chromatograph-mass spectrometer is used to measure the concentration of the identification characteristic flavor compounds of cheddar cheeses of known grades and cheddar cheese to be tested.

8. The method for judgment of cheddar cheese grade based on identification characteristic flavor compounds according to claim 7, characterized in that a gas chromatographic conditions are stated as follows: helium is used as a carrier gas, of which flow velocity is up to 1 mL/min; chromatographic column is DB-WAX capillary column; temperature rise procedures of chromatographic column are stated as follows: initial column temperature is 35° C., which is maintained for 5 minutes; a solvent is delayed for 4 minutes, and then is increased to 100° C. at the rate of 5° C./min; the temperature is maintained for 2 minutes, and then is further increased to 180° C. at the rate of 6° C./min; finally, temperature is increased at the rate of 8° C./min to 230° C., and then maintained for 2 minutes; the splitless mode is selected with the temperature of injection port up to 250° C.; and mass spectrometry conditions are stated as follows: an electron ionization source is used; ionization energy is 70 eV; ion source temperature is 230° C.; interface temperature is 250° C.; quadrupole rod temperature is 150° C.; detector temperature is 280° C.; scan mode is full scan; mass range is m/z 20~350.

* * * * *